United States Patent [19]

Akkapeddi et al.

[11] Patent Number: 5,283,285

[45] Date of Patent: Feb. 1, 1994

[54] HIGH IMPACT POLYESTER/POLYCARBONATE BLENDS

[75] Inventors: Murali K. Akkapeddi, Morristown; Bruce VanBuskirk, Dover, both of N.J.

[73] Assignee: AlliedSignal Inc., Morris Township, Morris County, N.J.

[21] Appl. No.: 43,945

[22] Filed: Apr. 5, 1993

[51] Int. Cl.$^5$ .................. C08L 69/00; C08L 67/02
[52] U.S. Cl. ........................... 525/67; 525/64; 525/109; 525/124; 525/131; 525/133; 525/146; 525/148; 525/439; 525/66
[58] Field of Search ............... 525/67, 109, 124, 131, 525/133, 146, 148, 439

[56] References Cited

U.S. PATENT DOCUMENTS

| | | | |
|---|---|---|---|
| 4,071,503 | 1/1978 | Thomas | 264/98 |
| 4,096,202 | 6/1978 | Faraham. | |
| 4,172,859 | 10/1979 | Epstein | 525/109 |

FOREIGN PATENT DOCUMENTS

| | | | |
|---|---|---|---|
| 0197789 | 10/1986 | European Pat. Off. . | |
| 066448 | 4/1984 | Japan | 525/67 |
| 282256 | 11/1989 | Japan . | |
| 1208585 | 10/1970 | United Kingdom . | |
| 12054 | 10/1990 | World Int. Prop. O. | 525/67 |

*Primary Examiner*—David Buttner
*Attorney, Agent, or Firm*—Roger H. Criss

[57] ABSTRACT

This invention relates to a blend comprising a polyester, polycarbonate and an amine functinalized elastomer and optionally an effective amount of an effective graft coupling agent.

32 Claims, 4 Drawing Sheets

FIG. 3

EFFECT OF PROMOTER ON HEAT AGED IMPACT STRENGTH OF 40/40/20 PET/PC/EPR BLENDS

HIGH IMPACT POLYESTER/POLYCARBONATE BLENDS

BACKGROUND OF THE INVENTION

1. Field of the Invention

This invention relates to impact resistant polyester/polycarbonate blend compositions formed from a polyester, a polycarbonate, an amine functionalized elastomer and a graph coupling agent. Another aspect of this invention relates to articles of manufacture formed totally or in part from the blends of this invention.

2. Prior Art

Blends of polyester and polycarbonates, and the use of same to fabricate articles such as molded parts are known. See for example, U.S. Pat. Nos. 4,522,797; 4,764,556; 4,897,448; 4,737,545; 4,629,760; and 4,753,980 and EPO 0 180 648.

The addition of carbodiimides or polycarbodiimides to various polymers such as polyesters, polyetheresters, acrylate-butylenediacrylate-diallyl maleate-methacrylate copolymers is known. See for example, U.S. Pat. Nos. 3,975,329; 4,071,503; 4,110,302; 4,689,372 and 4,465,839; and Chem. Abs. 85, 1785339 (1976); 78 17364C (1973); and 104, 150170K.

SUMMARY OF THE INVENTION

One aspect of this invention relates to a polymer blend comprising:
i. a polyester;
ii. a polycarbonate;
iii. an amine functionalized elastomer; and
iv. a graft coupling agent for grafting said elastomer to said polyester.

Yet another aspect of this invention relates to a polymer blend comprising:
i. a polyester;
ii. a polycarbonate;
iii. an amine functinalized elastomer;
iv. a graft copolymer of said polyester and said elastomer; and
v. residue of a graft promoter from the grafting of said polyester to said elastomer.

The blends of this invention exhibit several advantages. For example, the blends of this invention exhibit relatively high impact strengths both at room temperature (i.e. about 24° C.) and low temperatures (i.e. about −40° C.), and retain a substantial portion of both room and low temperature impact strengths after annealing or heat treatment. The blends of this invention also exhibit relatively low melt viscosities for good melt flow during melt processing. When these property advantages are combined with other properties of polyester/polycarbonate blends, such as chemical resistance and heat resistance, the blends of this invention provide significant value in molding applications.

Yet another aspect of this invention relates to the article of this invention comprising a body all or a portion of which is formed from the blend of this invention.

Still another aspect of this invention relates to the process of this invention which comprises:

melt blending a polyester, a polycarbonate and an amine functionalized elastomer in the presence of an effective amount of an effective graft coupling agent for grafting said elastomer to said polyester.

DESCRIPTION OF THE PREFERRED EMBODIMENTS

The composition of this invention includes three primary ingredients. As a first primary component, the blend of this invention comprises an effective amount of a thermoplastic polyester. The particular thermoplastic polyester chosen for use can be a homopolyester or a co-polymers, or mixtures thereof as desired. Thermoplastic polyesters are normally prepared by the condensation of an organic dicarboxylic acid and an organic diol, and, therefore illustrative examples of useful polyesters will be described herein below in terms of these diol and dicarboxylic acid precursors.

Polyesters which are suitable for use in this invention are those which are derived from the condensation of an aliphatic, cycloaliphatic or aromatic diol with an aliphatic, aromatic and cycloaliphatic dicarboxylic acid illustrative of useful cycloaliphatic diols are those having from about 5 to about 8 carbon atoms such as 1,4-dihydroxy cyclohexane;

1,4-dihydroxymethylcyclohexane,1,3-dihydroxycyclopentane, 1,5-dihydroxycycloheptane, 5-dihydroxycyclooctane, 1,4-cyclohexane dimethanol, and the like. Illustrative of suitable aliphatic diols are those having from about 2 to about 12 carbon atoms and preferably those having from about 2 to about 6 carbon atoms such as ethylene glycol, 1,5-pentane diol, 1,6-hexane diol, 1,4-butane diol, 1,12-dodecane diol and geometrical isomers thereof.

Suitable dicarboxylic acids for use as monomers for the preparation of useful thermoplastic polyesters are linear and branched chain saturated aliphatic dicarboxylic acids, aromatic dicarboxylic acids and cycloaliphatic dicarboxylic acids. Illustrative of aliphatic dicarboxylic acids which can be used in this invention are those having from about 2 to about 50 carbon atoms, as for example, oxalic acid, malonic acids, dimethylmalonic acid, succinic acid, octadecylsuccinic acid, pimelic acid, adipic acid, trimethyladipic acid, sebacic acid, suberic acid, azelaic acid and dimeric acids (dimerization products of unsaturated aliphatic carboxylic acids such as oleic acid) and alkylated malonic and succinic acids, such as octadecylsuccinic acid, and the like.

Illustrative of suitable cycloaliphatic dicarboxylic acids are those having from about 6 to about 15 carbon atoms. Such useful cycloaliphatic dicarboxylic acids include 1,3-cyclobutanedicarboxylic acid, 1,2-cyclopentanedicarboxylic acid, 1,3- and 1,4-cyclohexanedicarboxylic acid, 1,3- and 1,4-dicarboxymethylcyclohexane and 4,4′-dicyclohexdicarboxylic acid, and the like. Illustrative of useful aromatic carboxylic acids are terephthalic acid, isophthalic acid, o-phthalic acid, 1,3-, 1,4-, 2,6 or 2,7-naphthalenedicarboxylic acid, 4,4'-diphenyldicarboxylic acid, 4,4'-diphenylsulphone-dicarboxylic acid, 1,1,3-trimethyl-5-carboxy-3-(p-carboxyphenyl)-idane, diphenyl ether 4,4'-dicarboxylic acid bis-p(carboxyphenyl)methane and the like.

Polyester compounds prepared from the condensation of an aliphatic or cycloaliphatic diol, such as ethylene glycol, 1,4-butane diol, and 1,4-dihydroxy cyclohexane and an aromatic dicarboxylic acid such as benzene dicarboxylic acid and naphthalene dicarboxylic acid are preferred for use in this invention. In the most preferred embodiments of this invention poly(ethylene terephthalate), poly(butylene terephthalate), and poly(1,4-cyclohexane dimethylene terephthalate), are the polyesters of choice. Among these polyesters of choice, poly(ethylene terephthalate) and poly(butylene terephthalate) are most preferred. For the composition of this invention, recycled poly(ethylene terephthalate) is useful and preferred.

The number average and the weight average molecular weight of the polyester may vary widely. Usually, the polyester is of a number average or weight average molecular weight that is sufficiently high to form a molded part and sufficiently low to allow melt processing of the polyester/polycarbonate/elastomer blend into a molded product. Such number average or weight average molecular weights are well-known to those of skill in the molding art and are usually at least about 5,000 as determined by gel permeatiom chromotography, osmometry, light scaterring methods and endgroup analysis. The number average molecular weight is preferably from about 10,000 to about 100,000, more preferably from about 15,000 to about 75,0000 and most preferably from about 20,000 to about 50,0000.

The intrinsic viscosity of the polyester is not critical and may vary widely depending on the processing requirements. The polyester should preferably have an intrinsic viscosity of at least about 0.3 dl/g; more preferably the from about 0.4 to about 1.2 dl/g; and most preferably from about 0.5 to about 0.95 dl/g. These viscosity values are determined with the use of a standard Ubbehlohde viscometer in a phenol-tetrachloroethane (60/40 v/v) solution in a concentration of 0.5% at room temperature.

The polyesters should preferably have active chain end groups viz., carboxylic acid end groups or an electrophilic derivative thereof. While we do not wish to be bound by any theory, it is believed that the carboxylic acid end groups are reactive with the amine groups of the elastomer. Thus, when contacted with an appropriate graft coupling agent under appropriate conditions reaction of such amine and carboxylic acid groups form amide linking groups which link the polyester and elastomer. The concentration of such groups may vary widely, but is preferably at least about 0.01 meq/g, more preferably at least about 0.02 meq/g and most preferably from about 0.03 to about 0.05 meq/g. The end groups can be determined by standard titrametric methods for carboxyl or hydroxyl determination.

The amount of polyester included in the composition may vary widely and amounts used in conventional polycarbonate/polyester blends can be used. In the preferred embodiments of the invention, the amount of polyester employed is equal to or greater than about 10 weight percent based on the total weight of elastomer, polyester and polycarbonate in the blend, and in the particularly preferred embodiments of this invention is from about 20 to about 80 weight percent on the aforementioned basis. Amongst these particularly preferred embodiments, most preferred are those embodiments where the amount of polyester employed is from about 40 to about 60 weight percent based on the total weight of polycarbonate, elastomer and polyester in the blend.

As a second primary ingredient, the composition of this invention includes a polycarbonate. Essentially any conventional polycarbonate can be used in the practice of this invention, as for example those described in U.S. Pat. Nos. 4,018,750 and 3,153,008 and references cited therein.

Illustrative of useful polycarbonates are those having one or more recurring monomeric units of the formula:

where —R— is a divalent aromatic group. Permissible aromatic —R— groups include substituted or unsubstituted phenyl, tolyl, xylyl, ethylphenyl, isopropylphenyl and the like two or more of which may be linked together by divalent linking functions such as divalent alkylene or halogenated alkylene (i.e. —CH$_2$—, —C$_2$H$_4$—, —C$_3$H$_6$—, and —C$_4$H$_8$—), —SO$_2$—, —S—, —C(O)O—, —C(O)—, —NH—, —O— and the like. Examples include:

2,2-bis(3-chlorophenyl)propane; 2,2-bis(3-nitro phenyl)hexafluoropropane; 2,2-bis (5-methyl diphenyl) pentane; 2,4'-(5-methyl diphenyl)methane; bis-(5-ethyl phenyl)methane; bis(phenyl)methane; bis-(2-methoxy-5-nitrophenyl)methane; 1,1-bis(2-methoxy phenyl)ethane; 3,3-bis(phenyl)pentane; 2,2-dimethyl diphenyl; 2,6-dimethyl naphthalene; bis-(2-methyl diphenyl)sulfone; bis-(3,5-diethyl-2-methyl phenyl)sulfone;

2,4'-dimethyl diphenyl sulfone;

5'-chloro-3,3'-dimethoxy-diphenyl sulfone; bis-(dichloro phenyl)diphenyl sulfone; bis-(dichloro phenyl)diphenyl sulfone; 4,4'-3,3'-dimethoxy diphenyl ether; 4,4-3,3'-dimethoxy-3,3'-dichlorodiphenyl ether; 3,3-dicyano-2,5'-dihydroxydiphenyl ether; and the like. Also, useful as the polycarbonate component are modified polycarbonates or polycarbonate copolymers such as those containing copolymerized aromatic ester segments as for example polyestercarbonates.

The preferred aromatic polycarbonates are those selected from the group consisting of poly(2,2-'bis-(4-hydroxyphenyl)alkane)carbonates and poly(2,2'-bis-(4-hydroxy-3,5-dimethylphenyl)alkane)carbonates. The most preferred of these polycarbonates is a poly(2,2'-bis-(4-hydroxyphenyl)propane) carbonate.

Useful aromatic polyester can be manufactured by known processes or obtained from commercial sources. For example, useful polyester can be prepared by reacting a dihydric phenol as for example, those disclosed in U.S. Pat. Nos. 4,126,602, 2,999,835, 3,028,365, 3,334,154, and 4,131.575 with a carbonate precursor, such as phosgene, haloformate or carbonate ester as disclosed in U.S. Pat. No. 4,018,750, or by transesterification processes as disclosed in U.S. Pat. No. 3,153,008, as well as other processes well known to the art.

The amount of polycarbonate included in the composition may vary widely and amounts used in conventional polycarbonate/polyester blends can be used. In the preferred embodiments of the invention, the amount of polycarbonate employed is equal to or greater than about 10 weight percent based on the total weight of elastomer, polyester, and polycarbonate in the blend, and in the particularly preferred embodiments of this invention is from about 20 to about 80 weight percent on the aforementioned basis. Amongst these particularly preferred embodiments, most preferred are those embodiments where the amount of polycarbonate employed is from about 40 to about 60 weight percent based on the total weight of polycarbonate, elastomer and polyester in the blend.

The number average molecular weight of the polycarbonate may vary widely. Polycarbonates useful in the practice of this invention preferably have a number-average molecular weight of from about 5,000 to about 80,000. More preferably, the number-average molecular weight is from about 10,000 to about 40,000.

The intrinsic viscosity of the polycarbonate may vary widely provided that the viscosity is not so high as to prevent melt processing of the blend. The polycarbonates preferably have an intrinsic or inherent viscosity of at least about 0.2 dl/g, (deciliters/gram) as determined in dichloromethane by standard ubbehlohde viscometry at room temperature e.g. 25° C. The instrinsic viscosity is more preferably from about 0.2 to about 1.2 dl/g, is more preferably of about 0.2 to 0.9 dl/g and is most preferably from about 0.3 to about 0,6 dl/g.

Although not essential, the polycarbonates should preferably contain hydroxyl end groups.

As a third primary ingredient, the composition of this invention includes an amine functionalized elastomer. As used herein, an "amine functionalized elastomer" is a polymer having a polymeric backbone derived from polymerization of one or more $\alpha, \beta$-unsaturated monomers, diene monomers or a combination thereof, having pendant amine functions, terminal amine functions or a combination thereof. Useful rubbers may homopolymers, or block or random copolymers. Blends of two or more rubbers may also be used in the practice of this invention.

Illustrative of useful dienes are butadiene, 1,4-hexadiene, 1,6-octadiene, 5-methyl-1,4-hexadiene, 3,7-dimethyl-1,6-octadiene, 1,4-cyclohexadiene, 5-ethylidene-2-norbornene, 5-propenyl-2-norbonene, 5-isopropylidene norbornene, 5-methylene narbonene, and the like. Illustrative of useful olefins are aliphatic and aromatic lefins such as ethylene, propylene, isobutylene, styrene, trichlorofluoroethylene, tetrafluoroethylene, acrylic acid, methyacrylic acid, vinyl toluene, alkyl acrylates such as methyl mathacrylate and methyl acrylate and the like.

The elastomer useful in the practice of this invention have an ASTM D-638 tensile modulus equal to or less than about 40,000, preferably equal to or less than about 20,000, more preferably equal to or less than about 10,000, and most preferably equal to or less than about 5,000. The elastomers have a Mooney viscosity of from about 10 to about 100 ML 1+8@127° C. units, preferably of from about 15 to about 80 units and more preferably of from about 25 to about 70 units.

Useful amine functionalized elastomers may be prepared by procedures known to those of ordinary skill in the art or may be obtained from commercial sources. For example, useful may useful elastomers may be prepared by the methods described in U.S. Pat. No. 4.987,200. Moreover, useful amine functionalized butadiene/acrylonitrile copolymers (NBRs) are commercially available for Copolymer Rubber Chemical Corporation under the tradename Nysin DN 508-14A.

Preferred elastomers are those in which the polymeric backbone are formed predominantly from alkyl acrylates, butadiene, ethylene, styrene, isobutylene, propylene, acrylonitrile, and may be homopolymers, copolymers, terpolymers and the like. More preferred polymeric backbones are polybutadiene, polyisoprene, butadiene/styrene copolymers, acrylonitrile/butadiene copolymers, isobutylene/butadiene copolymers, ethylene/propylene copolymers, ethylene/ propylene/diene terpolymers, ethylene/alkylacrylate copolymers, styrene/butadiene copolymers; and most preferred polymeric backbones are butadiene/acrylonitrile copolymers, ethylene/propylene copolymers, ethylene/alkyl acrylate copolymers, and styrene/butadiene copolymers. The polymeric backbone of choice is a copolymer having two or more divalent alkylene recurring monomeric units. Useful examples are amine functionalized ethylene/propylene copolymers and terpolymers and amine functionalized butadiene/acrylonitrile copolymers (NBR) and their hydrogenated derivatives.

The polymeric backbone is modified by copolymerization or by post reaction to form pendant amine functionalities randomly distributed along the polymeric block, terminal amine functionalities at one or both ends of the polymeric block or a combination thereof. Illustrative of such amino groups are amine ($-NH_2$) and alkyl amino groups, having an active hydrogen such as e.g. methylamine ($-NHCH_3$), ethylamine ($-NHC_2H_5$), propylamine ($-NHC_3H_7$), and butylamine ($-NHC_4H_9$) and isonomers thereof. The amino group of choice is amine ($-NH_2$).

Useful grafting and copolymerization techniques used in the preparation of the same functionalized elastomer are disclosed in U.S. Pat. No. 4,987,200. In the preferred embodiments of the invention, amine functionalities are randomly distributed along the polymeric backbone and are formed by copolymerization of the monomer precursors of the recurring monomeric units in the polymeric backbone with an ethylenically unsaturated monomer containing the desired amine functionality such as p-aminostyrene, 2-aminopropylacrylamide, norbornene unsaturation types including norbornene and its higher homologs e.g. norbornenyl-methyl amines.

The mole percent of pendant and terminal mine functionalities may vary widely. The only requirement is that the amount is sufficient to allow some grafting of the elastomer and the polyester.

The amount of elastomer included in the composition may vary widely. Usually, the amount of elastomer is at least about 1% by weight of the polyester, polycarbonate and elastomer in the composition. The amount of elastomer is preferably from about 5 to about 30% by weight, more preferably from about 5 to about 20% by weight and most preferably from about 10 to about 20% by weight based on the total weight of polyester, elastomer and polycarbonate in the composition.

In the preferred embodiments of this invention, the composition includes an effective amount of an suitable "graft-coupling agent". As used herein a "graft-coupling agent" is a reagent which is believed to promote the coupling reaction between the amine functionalized elastomer and the polyester and/or chain extension crosslinking the polyester and the amine functionalized elastomer, respectively. Any graft-coupling agent which provides this function can be used in the practice of this invention. Illustrative of such graft coupling agents are phosphites such as triscaprolactam phosphorous; and phosphites having alkyl, aryl, alkylaryl and aralkyl substituents such as trinonylphenyl phosphite and triphenyl phosphite; and the like. Such graft coupling agents are described in greater detail in U.S. Pat. Nos. 5,037,897; 5,124,411; and the like.

Other useful graft coupling agents are polycarbodiimides. Illustrative of useful polycarbodiimides comprise repeat units of the formula:

wherein —$R_2$— is a divalent hydrocarbon radical such as aliphatic radicals having from 1 to about 20 carbon atoms such as methylene, butylene, isobutylene, nonylene, dodecylene, neopentylene and the like; cycloaliphatic radicals having from 5 to about 12 carbon atoms such as cyclo-octylene, 1,4-dimethylene cyclohexylene, cyclohexylene and the like; aromatic radicals having from 6 to about 16 carbon atoms such as phenylene, naphthalene, 1,4-dimethylene phenylene, bisphenylene, diphenylmethane, 2,2-diphenylene propane and the like; or aliphatic, aromatic or cycloaliphatic radicals containing one or more divalent radicals of the formula: —O—, —$SO_2$—, —C(O)—, —C(O)O)—, —NH—, —S— and the like, such as diphenylene sulfone, diphenylene ether, diphenylene ketone, diphenylene amine, diphenylene sulfide, and the like.

Particularly useful polycarbodiimides include poly (2,4,6-triisopropyl-1,3-phenylene carbodiimide); poly(2,6 diisopropyl-1,3-phenylene carbodiimide), poly(tolyl carbodiimide); poly(4,4'-diphenylmethane carbodiimide); poly(3,3'-dimethyl-4,4'-biphenylene carbodiimide); poly(pphenylene carbodiimide); poly(m-phenylene carbodiimide); poly(3,3'-dimethyl-4,4'-diphenylmethane carbodiimide); poly(naphthylene carbodiimide); poly(isophorone carbodiimide); poly(cumene carbodiimide); poly(mesitylene carbodiimide); and mixtures thereof. Preferred polycarbodiimide are poly(2,6-diisopropyl-1,3-phenylene carbodiimide) (Stabaxol®P), poly (2,4,6-triisopropyl-1,3-phenylene carbodiimide) (Stabaxol®P-100) and poly(2,2', 6,6'-tetraisopropyldiphenylene carbodiimide) (Stabaxol® D). These preferred materials are commercially available as Stabaxol® grades from Rhein-Chemie.

Useful polycarbodiimides may be formed by processes known to those of skill in the art or from commercial sources. For example, useful polycarbodiimides can be prepared by heating the corresponding isocyanates in the presence or absence of a solvent and a catalyst such as phosphorus containing catalysts. These procedures are described in greater detail in U.S. Pat. No. 2,853,473 and Monogle, J. J. "Carbodiimides., II. Conversion of Isocyanates to Carbodiimides. Catalyst Studies", *J. Org. Chem.*, 27, 3851 (1962).

Another class of graft-coupling agents are blocked isocyanates and diisocyanates. Examples are caprolactam blocked methylene bis(4,4'-diisocyanatobenzene) (blocked MDI), blocked toluene 2,4-diisocyanate and the like. Useful blocked isocyanates and blocked diisocyanates can be prepared by known techniques or obtained from commercial sources as for example from Miles under the tradename Desmodur isocyanates.

Yet another class graft coupling agents are di or multifunctional epoxides such as diglycidyl ether of bisphenol-A, triglycidyl ether of p-aminophenol, and epoxynovolacs (EPN-1138, ECN-1299). Certain of these materials can be prepared by procedures known to those of ordinary skill in the art or can be obtained from commercial sources as for example Ciba Geigy.

Other class of graft-coupling agents include multifunctional oxazolines (e.g. m-phenylene bisoxazolines) commercially available from Takeda, Japan.

The composition includes an "effective amount of graft-coupling agent". As used herein, an "effective amount of graft coupling agent" is an amount which when melt blended with a composition of the thermoplastic polyester, polycarbonate and amine functionalized elastomer is sufficient to enhance the extent to which a composition retain its impact strength (notch izod, at low and/or high temperature) after annealing. Usually, the amount of graft promoter is at least about 0.1% by weight of the polyester, polycarbonate and elastomer in the composition. The amount of graft promoter is preferably from about 0.3 to about 5% by weight, more preferably from about 0.5 to about 2% by weight and most preferably from about 1 to about 2% by weight on the aforementioned basis.

In addition to the above-described essential components, the blend of this invention can include various optional components which are additives commonly employed with polyester and polycarbonate resins. Such optional components include fillers such as talc, fiberglass, clay and the like; plasticizers, such as lactams, polyesters and sulfonamides such as caprolactam, aluryllactam, ortho and paratoluene ethyl sulfonamides polyester glutamate, polyester glycol, polyester adipate and the like, impact modifiers, chain extenders; colorants and pigments such as iron oxide, calcium red, rhodamine, chrome yellow, chrome green, phthalo-cyanine blue and the like; mold release agents; antioxidants; ultra violet light stabilizers; nucleators; lubricants; anti-static agents; fire retardants; and the like. These optional components are well known to those of skill in the art, accordingly, will be described herein in detail. These optional materials may be incorporated process. Typically, such optional materials are included in the mixing seeped for formation of the blend or in subsequent melt forming processes such as injection molding.

The composition of this invention exhibits relatively high impact strength both at room temperature (i.e. about 24° C.) and at low temperature (down to about −40° C.) as measured by ASTMD-256 notched Izod at 23° C., 0.1875 inch (0.476 cm) thick samples and ASTM D-638 tensile strength modulus and elongation. The blend preferably retains all or substantially all the room and low temperature strength after heating at 70° C. to 160° C. for up to 72 hours. In the preferred embodiment of this invention the composition maintains a "useful level of room and low temperature impact strength" after annealing from about 16 to about 72 hrs. at 150° C. As used herein, a "useful level of room and low temperature impact strength" is equal to or greater than 50 ft. lbs of drop weight impact strength and an initial Notched Izod before annealing at low and room temperature of equal to or greater than 5 ft lbs/in, preferably equal to or greater than about 8 ft lbs/in, more preferably equal to or greater than about 10 ft lb/in and most preferably equal to or greater than 12 ft lb/in. Amongst these preferred embodiments of the invention, preferred are the compositions which retain at least about 25% of their room temperature (23° C.) impact strength (notched izod) and at least about 20% of their low temperature (−40° C.) impact strength (notched izod) after annealing; more preferred are the compositions which retain at least about 40% of their room temperature impact strength and at least about 30of their low temperature impact strength after annealing; and most preferred are the compositions which retain at least about 60% of their room temperature impact strength and at least about 40% of their low temperature impact strength after annealing.

The composition of this invention can be prepared by blending or mixing the essential ingredients, and other optional components, as uniformly as possible employing any conventional blending means. Appropriate blending means, such as melt extrusion, batch melting and the like, are well known in the art and will not be described here in greater detail. See for example, "Extrusion" in the Encyclopedia of Polymer Science of Technology, Vo. 6, p. 571–631; John Wiley & Sons, 1986, incorporated herein by reference. Usefully, the blending procedure can be carried out at elevated temperatures above the melting point of the polymers added either alone or as a combination in a suitable form as for example, granules, pellets and powders are added to the melt with vigorous stirring. For example, the polyester can be masterbatched or preblended with the polycarbonate and elastomer in the melt and this premixed or masterbatch added to the polycarbonate and elastomer in the melt in amounts sufficient to provide the desired amount of polymers, polycarbonate and elastomer in the blend product. Similarly the blending procedure can be carried out at elevated temperatures, where one or the polymer components is melted and the other polymer component is admixed therewith by vigorously stirring the melt. Similarly, the various solid components can be granulated, and the granulated components mixed dry in a suitable blender, as for example, a Banbury mixer, as uniformly as possible, then melted in an extruder and extruded with cooling.

Alternatively, the composition of this invention can be formulated by dissolving the components in an appropriate inert solvent, after which the solvent is removed by evaporation, or other conventional solvent removing means are employed to provide the composition. The solvent is not critical, the only requirement being that it is inert to the components of the composition, and it is capable of solubilizing the various components, or at least forming dispersion thereof.

The blend according to the invention can be used for those applications for which polyesters, polycarbonates and blends thereof can be used. They are thermoplastic materials from which molded articles of manufacture having valuable properties can be produced by conventional polymer shaping processes, such as injection molding and extruding. Examples of such moldings are components for technical equipment, lawn and garden equipment, power snow shovel and snow-mobile equipment, household equipment, sports equipment, power-tool equipment for the electrical and electronics industries and electrical insulations, automobile components, and semi-finished products which can be shaped by machining. The composition of this invention is especially suited for use in the fabrication of automotive parts, especially, those for use under the hood which may be exposed to high temperatures during the operation of the automobile. Similarly, the blend of this invention can be used to fabricate components of power-tools, snowmobiles and similar equipment operated outdoors.

The following examples are presented to better illustrate the invention and should not be construed as limiting the invention.

COMPARATIVE EXAMPLE 1

Blend of Poly(Ethylene Terephthalate) (PET)

Polycarbonate (PC) and Ethylene/Propylene Rubber (EPR)

A pellet/pellet mixture of 6 lbs of poly(ethylene terphthalate) (PET) (IV=0.7 dl/g in phenol/TCE, 0.035 meq/g COOH) and 3 lbs of an EPR (Exxon PE 901, ummodified, Mooney viscosity of 25) was fed into the throat of a 34 mm Leistritz corotating fully intermeshing twin screw extruder. The extruder contained 10 heated barrel sections with downstream feed capability at the 4th and 6th barrel sections. A typical temperature profile has the first three barrel sections heated to 250° C. and the rest heated to 270° C. Mixing elements are located in sections 5 & 7. Materials are typically starve fed at 30–35 lb/hr, at a screw speed of 200–250 revolutions per minute RPM.

Concurrently, 6 lbs of PC (GE Lexan 101) was added downstream in barrel section 4. The extrudate was water cooled, pelletized, and vacuum dried for injection molding.

COMPARATIVE EXAMPLE 2

Blend of Poly(Ethylene Terephthalate) (PET)

Polycarbonate (PC) and Maleated Ethylene Propylene Rubber (MA-EPR)

Using the procedure of Comparative Example 1, a pellet/pellet mixture of 1.2 kg of PET (IV=0.7 dl/g in phenol/TCE, 0.035 meq/g COOH), 1.2 kg of PC (GE Lexan 101), and 0.6 kg of MA-EPR (Exxon Excelor 1803, 0.7% maleation, a Mooney Viscosity of 25) was extruded on a Haake TW-100 conical twin screw extruder at 75 RPM. The extruder was heated to 230° C. 265° C., 280° C., 280° C. (zones 1–4). The extrudate was water cooled, pelletized and vacuum dried for use in injection molding experiments.

EXAMPLE 1

Blend of Poly(Ethylene Terephthalate) (PET),

Polycarbonate (PC) and Aminated Ethylene Propylene Rubber (A-EPR)

Using the procedure of Comparative Example 1, a pellet/pellet mixture of 6 lbs of PET (IV=0.7 dl/g in phenol/TCE, 0.035 meq/g COOH) and 3 lbs of an A-EPR was fed into the throat of the Leistritz extruder. Concurrently, 6 lbs of PC (GE Lexan 101) was added downstream in barrel section 4. The extrudate was water cooled and was pelletized and vacuum dried for use in injection molding experiments.

EXAMPLE 2

Blend of Poly(Ethylene Terephthalate) (PET),

Polycarbonate (PC), Amine Functional Ethylene Propylene Rubber (A-EPR) and Graft Coupling Agent A pellet/pellet mixture of 4.65 lbs of PET (IV=0.7 dl/g in phenol/TCE, 0.035 meq/g COOH) and 3 lbs of an A-EPR was fed into the throat of the Leistritz extruder. Concurrently, 5.85 lbs of PC (GE Lexan 101) was added downstream in barrel section 4, and a powder/powder mixture of 1.2 lbs of powdered PET (IV=0.7 dl/g in phenol/TCE, 0.035 meq/g COOH) and 0.3 lbs of a graft-coupling agent, poly(2,4,6-triisopropyl-1,3-phenylene carbodiimide) (Rhein Chemie Stabaxol P-100 powder) was added downstream in barrel section 6. The resulting blend was pelletized for use in injection molding experiments.

COMPARATIVE EXAMPLE 3

Blend of Poly(Ethylene Terephthalate)(PET),Polycarbonate(PC), Maleated Ethylene/Propylene Rubber(MA-EPR) and Graft Coupling Agent A pellet/pellet mixture of 4.65 lbs of PET (IV=0.7 dl/g in phenol/TCE, 0.035 meq/g COOH) and 3 lbs of MA-EPR (Exxon Excelor 1803, 0.7% maleation, Mooney Viscosity of 25) was fed into the throat of the Leistritz extruder. Concurrently, 5.85 lbs. of PC (GE Lexan 101) was added downstream in barrel section 4, and a powder/powder mixture of 1.2 lbs of powdered PET (IV=0.7 dl/g in phenol/TCE, 0.035 meq/g COOH) and 0.3 lbs of a graft-coupling agent,poly(2,4,6-triisopropyl-1,3-phenylene carbodiimide) (Rhein Chemie Stabaxol P-100 powder) was added downstream in barrel section 6. The resulting blend was pelletized for use in injection molding experiments.

COMPARATIVE EXAMPLE 4

A series of experiments were carried out to show the effect of the amine functionalized ethylene/propylene elastomer on certain properties of blends of polyester and polycarbonates. The properties selected for evaluation were initial high and low temperature Notched Izod, high and low temperature Notched Izod after annealing, initial elongation-to-break and the elongation-to-break after annealing. The blends selected for comparison were those of Comparative Examples 1 and 2, and Example 1. In these experiments, pellets of the polymer blend are injection molded into ASTM test specimens on an Arburg 25 ton Allrounder molding machine. The molded specimens are tested for notched izod impact strength (ASTM D256), tensile strength and elongation (ASTM D638), and flexural strength and modulus (ASTM D790). Some specimens are also tested for drop wt impact strength (ASTM D3029).

The results of the experiments are set forth in the following Table 1. In the Table, the abbreviations have the following meanings:

(a) "NI-23" means initial Notched Izod of a sample after molding measured at 25° C.

(b) "NI-40" means initial Notched Izod of a sample after molding measured at −40° C.

(c) "ANI-23" means Notched Izod of a sample after annealing for from 16 to 72 hrs. at 150° C., measured at 25° C.

(d) "ANI-40" means Notched Izod of a sample after annealing for from 16 to 72 hrs. at 150° C., measured at 40° C.

(e) "EB" means the initial elongation to break of a sample after molding.

(f) "AEB" means the elongation to break of a sample after annealing for from 16 to 72 hrs. at 150° C.

TABLE I

| Exp. No. | Sample | NI-23 ft-lbs/in | NI-40 ft-lbs/in | ANI-23 ft-lbs/in | ANI-40 ft-lbs/in | EB % | AEB % |
|---|---|---|---|---|---|---|---|
| 1 | Ex. 1 | 14.6 | 16.9 | 6.9 | 4.0 | 196 | 19 |
| 2 | Comp. Ex. 1 | 13.6 | 1.5 | 1.9 | 1.6 | 4.2 | 8 |
| 3 | Comp. Ex. 2 | 14.2 | 2.7 | 3.1 | 1.1 | 9 | 11 |

COMPARATIVE EXAMPLE 5

Figure 1:
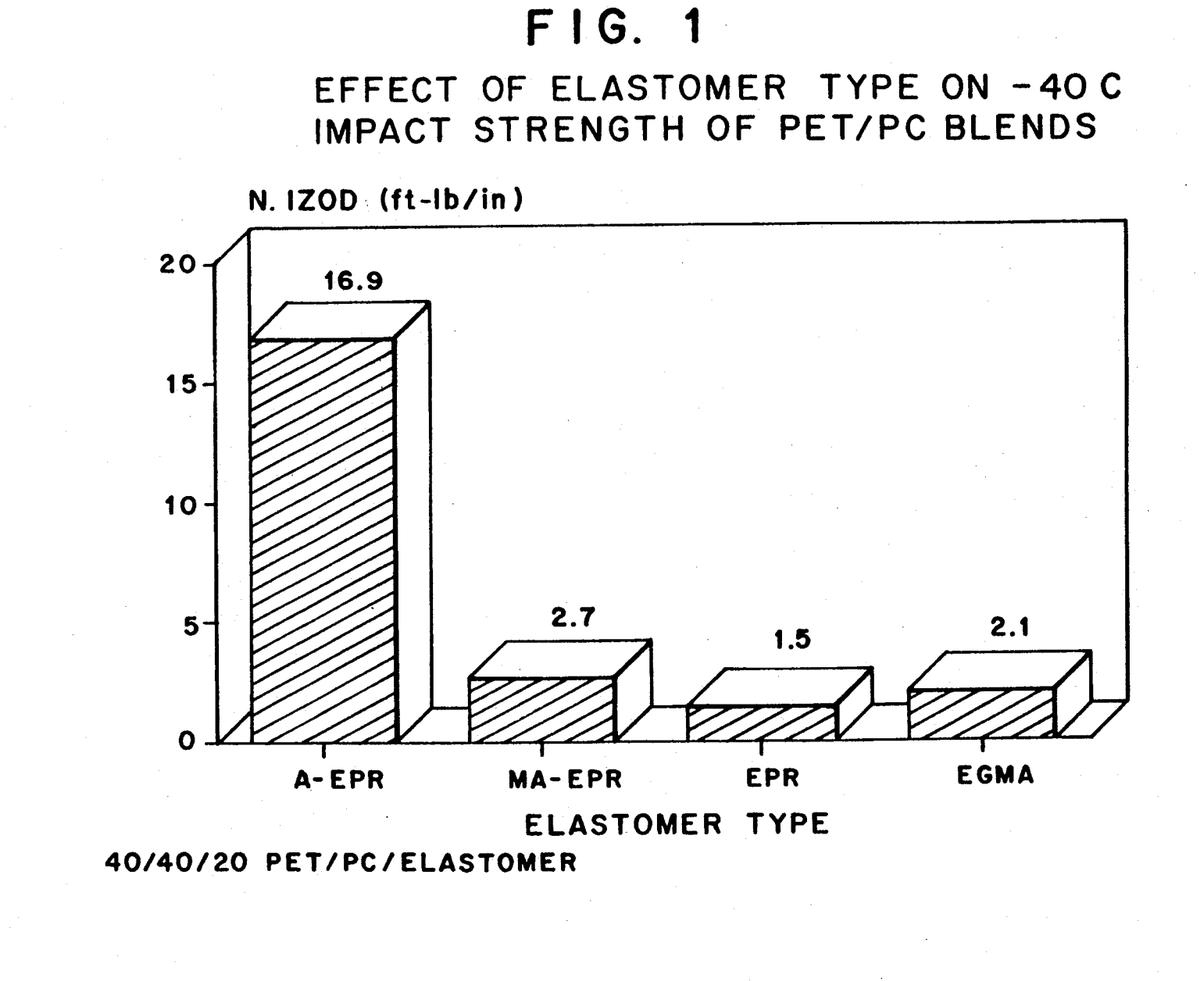
FIG. 1 is a bar graph of Notched Izod vs. Elastomer type showing the improved properties of the compositions of this invention.
Figure 2:
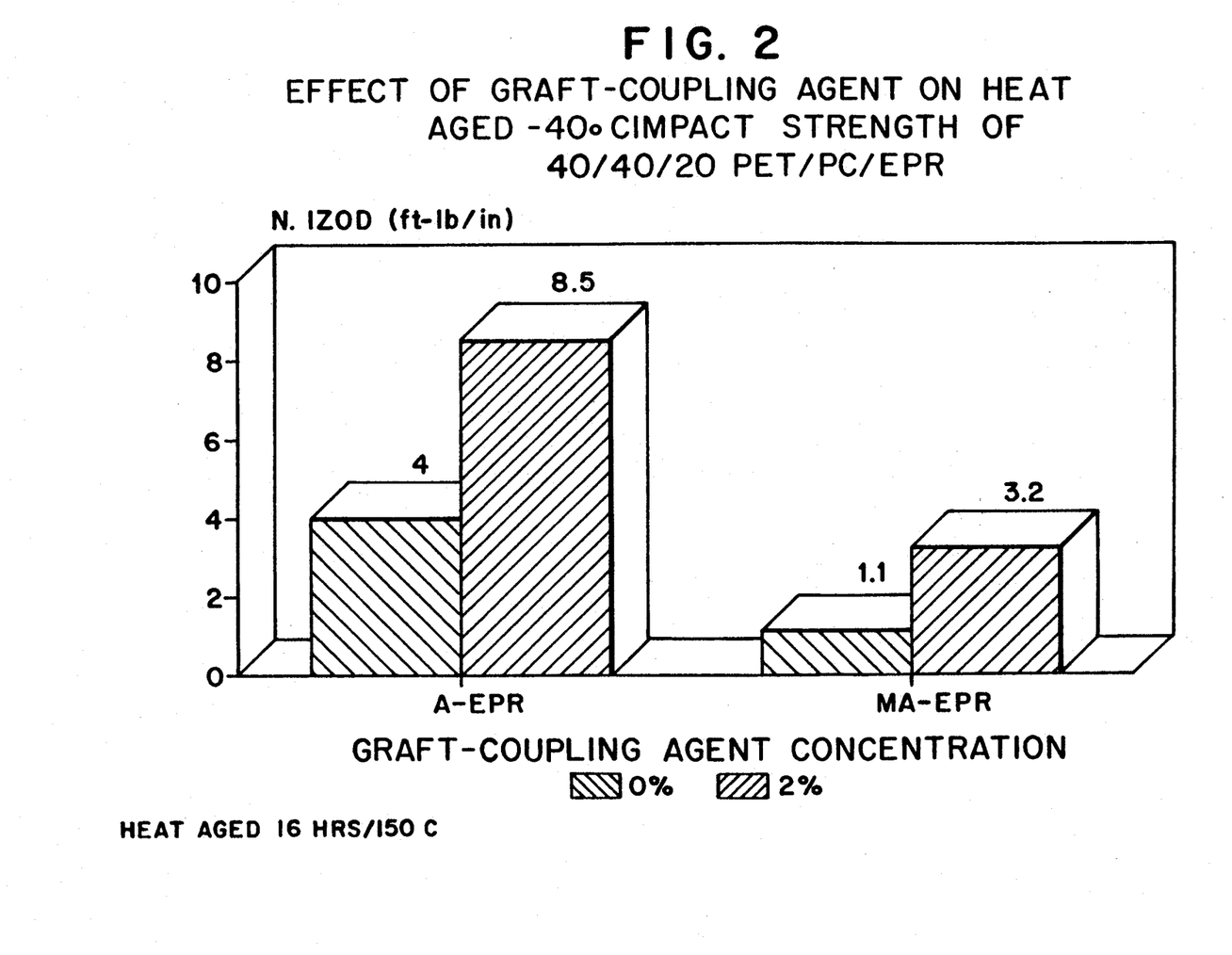
FIG. 2 is a bar graph of Notched Izod vs. graft coupling agent concentration showing the improved properties of the compositions of this invention.
Figure 3:
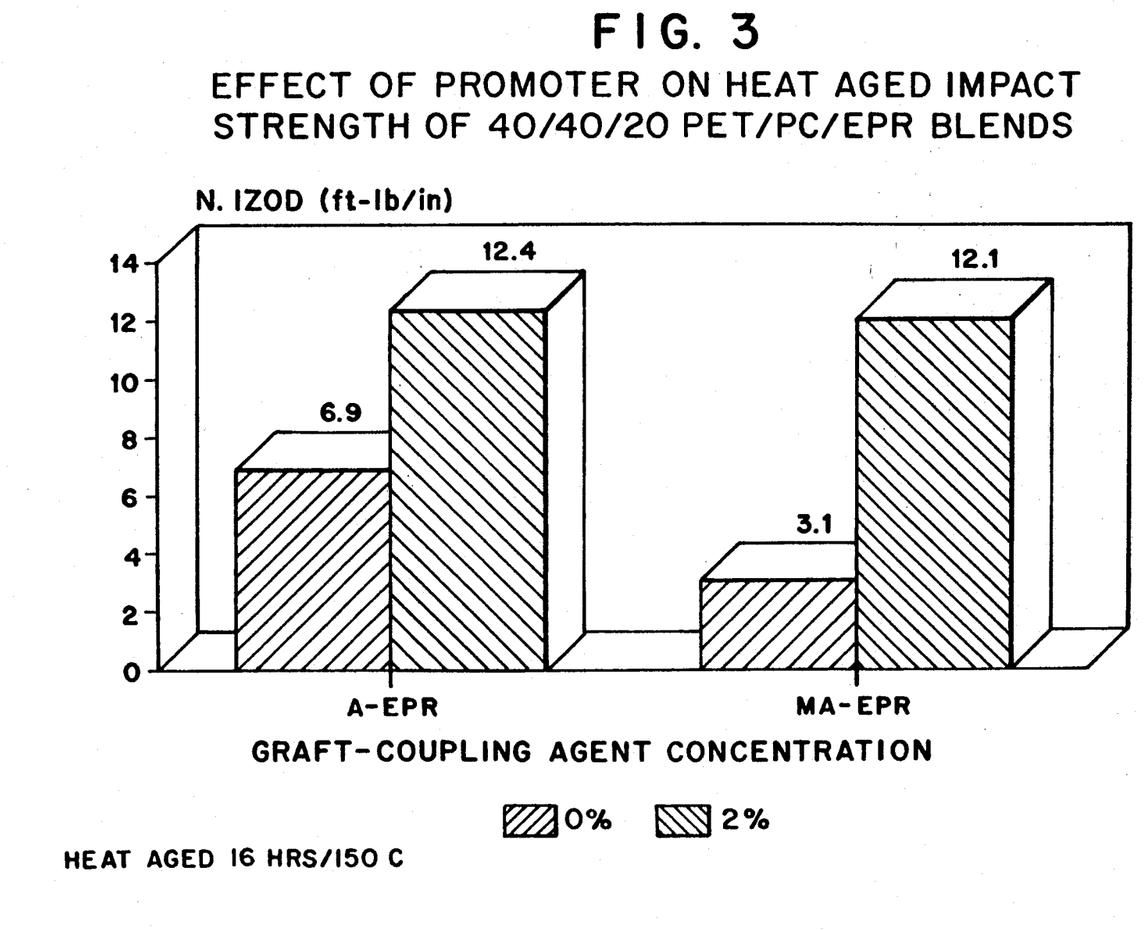
FIG. 3 is a bar graph of Notched Izod vs. graft coupling agent concentration showing the improved properties of the compositions of this invention.
Figure 4:
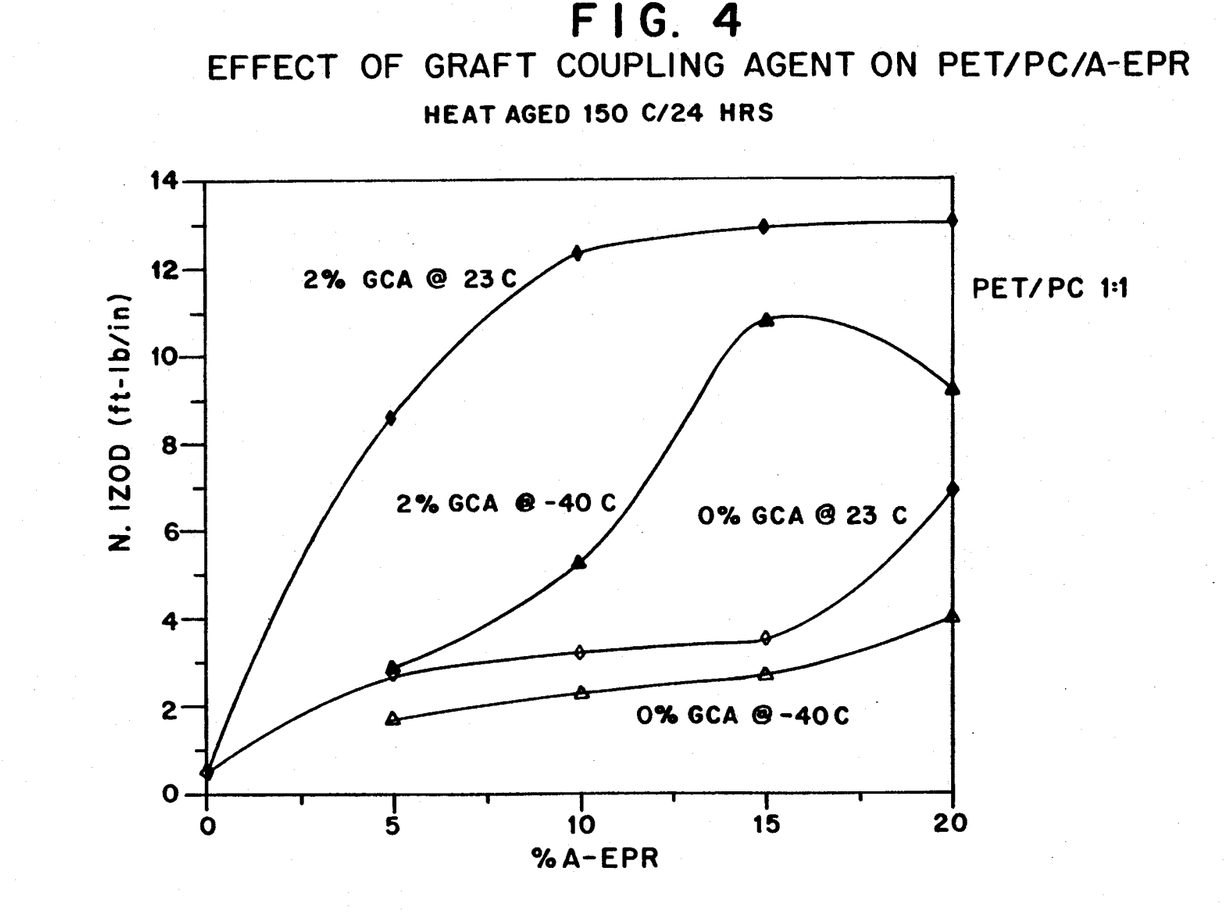
FIG. 4 is a graph of Notched Izod vs. weight percent amine functionalized elastomer showing the improved properties of the composition of this invention.

Using the procedures of Comparative Example 4, a series of experiments were carried out to show the effect of the combination of amine functionalized ethylene/propylene elastomer and graft coupling agent on certain properties of blends of polyester and polycarbonate. The properties selected for comparison were the same as in Comparative Example 4. The blends selected for comparison are those of Comparative Examples 1, 2 and 3, and Examples 1 and 2. The results of the experiments are set forth in the following Table II and FIGS. 1 to 4.

TABLE II

| Exp. No. | Sample | NI-23 ft-lbs/in | NI-40 ft-lbs/in | ANI-23 ft-lbs/in | ANI-40 ft-lbs/in | EB % | AEB % |
|---|---|---|---|---|---|---|---|
| 1 | Ex. 2 | 16 | 17.5 | 12.4 | 8.5 | 189 | 22 |
| 2 | Ex. 1 | 14.6 | 16.9 | 6.9 | 4 | 196 | 19 |
| 3 | Comp. Ex. 1 | 13.6 | 1.5 | 1.9 | 1.6 | 42 | 8 |
| 4 | Comp. Ex. 2 | 14.2 | 2.7 | 3.1 | 1.1 | 9 | 11 |
| 5 | Comp. Ex. 3 | 14.9 | 2.6 | 12.1 | 3.2 | 16 | 13 |

What is claimed is:

1. A polymer blend comprising:
   i. a thermoplastic polyester;
   ii. a polycarbonate;
   iii. an amine functionalized elastomer; and.
   iv. a graft coupling agent.

2. A blend of claim 1 wherein said thermoplastic polyester comprises recurring monomeric units derived from aliphatic or cycloaliphatic diols and from aromatic dicarboxylic acids or esters thereof.

3. A blend of claim 2 wherein said aliphatic diols have from 2 to about 12 carbon atoms and said cycloaliphatic diols have from 6 to about 15 carbon atoms.

4. A blend of claim 3 wherein said aromatic dicarboxylic acids are selected from the group consisting of dicarboxylic acids of benzene and dicarboxylic acids of naphthalene.

5. A blend of claim 4 wherein said thermoplastic polyester is selected from the group consisting of poly(ethylene terephthalate), poly(butylene terephthalate) and poly(1,4-cyclohexane dimethylene terephthalate).

6. A blend of claim 5 wherein said thermoplastic polyester is selected from the group consisting of poly(ethylene terephthalate) and poly(butylene terephthalate).

7. A blend of claim 6 wherein said thermoplastic polyester is poly(ethylene terephthalate).

8. A blend of claim 1 wherein said polyester is in an amount equal to or greater than about 10% by weight of the total weight of polyester, polycarbonate and elastomer in said blend.

9. A blend of claim 8 wherein said amount is from about 20 to about 40% by weight.

10. A blend of claim 9 wherein said amount is from about 40 to about 60% by weight.

11. A blend of claim 1 wherein said polycarbonate is selected from the group consisting of poly(2,2'-bis(4-hydroxy phenyl)alkane) carbonates and poly(2,2'-bis(4-hydroxy-3,5-dimethyl phenyl)alkane) carbonates.

12. A blend of claim 11 wherein said polycarbonate is poly(2,2'-bis(4-hydroxyphenyl)propane) carbonate.

13. A blend of claim 1 wherein said polycarbonate is in amount equal to or greater than about 10% by weight of polyester, polycarbonate and elastomer in said blend.

14. A blend of claim 13 wherein said amount is from about 20 to about 80% by weight.

15. A blend of claim 14 wherein said amount is from about 40 to about 60% by weight.

16. A blend according to claim 17 wherein said elastomer comprises recurring monomeric units derived from alkyl acrylates, butadiene, ethylene, styrene, isobutylene, propylene, acrylonitrile or a combination thereof.

17. A blend according to claim 16 wherein said elastomer is selected from the group consisting of amine functionalized polybutadiene, polyisoprene, butadiene/styrene copolymer, acrylonitrile/butadiene copolymer, isobutylene/butadiene copolymer, ethylene/propylene copolymer, ethylene/propylene/diene terpolymer and ethylene/alkylacrylate copolymer.

18. A blend of claim 17 wherein said elastomer is an amine functionalized ethylene/propylene copolymer or butadiene/acrylonitrile copolymer.

19. A blend of claim 1 wherein said amine groups are —NH$_2$, —NHR$_1$ (where R$_1$ is alkyl) or a combination thereof.

20. A blend of claim 1 wherein said elastomer is in an amount of at least about 1% by weight of the total weight of polyester, polycarbonate and elastomer in said blend.

21. A blend of claim 20 wherein said amount is from about 5 to about 30% by weight.

22. A blend of claim 21 wherein said amount is from about 10 to about 20% by weight.

23. A blend of claim 1 wherein said graft coupling agent is a polycarbodiimides having repeat units of the formula:

wherein:
R$_2$ is alkylene, arylene or cycloalkylene.

24. A blend of claim 23 wherein R$_2$ is arylene.

25. A blend of claim 24 wherein R$_2$ is diphenylene, phenylene or phenylene or diphenylene substituted with one or more alkyl groups having from 1 to about 7 carbon atoms.

26. A blend of claim 25 wherein said polycarbodiimide is selected from the group consisting of poly(2,6-diisopropyl-1,3-phenylene carbodiimide), poly(2,4,6-triisopropyl-1,3-phenylene carbodiimide) and poly(2,2',6,6'-tetraisopropyldiphenylene carbodiimide).

27. A blend of claim 1 wherein said graft coupling agent is in an amount at least about 0.01% by weight of polyester, polycarbonate and elastomer in the blend.

28. A blend of claim 27 wherein said amount is from about 0.3 to about 5% by weight.

29. A blend of claim 28 wherein said amount is from about 0.5 to about 2% by weight.

30. A polymer blend comprising:
i. a thermoplastic polyester;
ii. a polycarbonate;
iii. an amine functionalized elastomer;
iv. a graft copolymer of said polyester and said elastomer; and
v. residue of a graft coupling agent from the grafting of said polyester to said elastomer.

31. A process for forming a polymer blend comprising a thermoplastic polyester; a polycarbonate, an amine functionalized elastomer, a graft copolymer of said polyester and said elastomer, and a residue of a graft coupling agent from the grafting of said polyester to said elastomer, said process comprising melt blending a mixture comprising said polyester, said polycarbonate, said elastomer and said graft coupling agent.

32. A blend formed from the process of claim 31.

* * * * *